3,050,504
AQUEOUS PHASE POLYMERIZATION OF VINYL AND RELATED MONOMERS WITH ORGANIC COCATALYSTS
Daniel F. Herman, Orange, and Albert L. Resnick, Fairlawn, N.J., and Dominic Simone, Bronx, N.Y., assignors to National Lead Company, New York, N.Y., a corporation of New Jersey
No Drawing. Filed Mar. 6, 1959, Ser. No. 797,588
11 Claims. (Cl. 260—80)

This invention relates to the polymerization of vinyl and related monomers. In particular, this invention relates to a novel process for effecting the polymerization of vinyl and related monomers using a novel catalyst-cocatalyst system.

Processes incorporating certain titanium compounds such as $TiCl_4$ had previously been known and used in the polymerization of certain monomers, such as ethylene, propylene, and styrene. The compounds were generally used in conjunction with an organometallic compound, such as an alkyl metal compound. It is believed that the alkyl metal compound and titanium compounds when used together in the polymerization process reacted with one another resulting in an organotitanium compound and it was actually this organotitanium compound which was effective in the polymerization of monomers such as ethylene, propylene, and styrene; however these systems were not generally effective in the presence of polar media and for the polymerization of highly polar monomers, and furthermore, were unstable in the presence of water. Recently, see copending application Serial Number 714,503, filed February 11, 1958, and assigned to the assignee hereof, a new process utilizing a new type of titanium catalyst, which could be used in an aqueous system, was developed. This resulted in the development of cocatalysts which were effective in the presence of water, and which would increase the rate of polymerization and act in conjunction with the new type of titanium catalyst. The cocatalysts which had been developed and found to be effective in the presence of water and able to act in conjunction with the new type of titanium catalyst were the halogenated acetic acids, see copending application cited above.

An object of this invention, therefore, is to provide an improved method for the polymerization of vinyl and related monomers. Another object is to provide an improved method for the polymerization of vinyl and related monomers which may be carried out in an aqueous medium using a titanium or zirconium catalyst. Still another object is to provide an improved method for the polymerization of vinyl and related monomers in an aqueous medium using a titanium or zirconium catalyst and a cocatalyst which are effective in the presence of water. Other objects and advantages will become apparent from the following more complete description and claims.

Broadly, this invention contemplates a process for the polymerization of vinyl and related monomers, said monomers being selected from the group consisting of acrylates, alkyl substituted acrylates, styrene, alkyl substituted styrene, and acrylonitrile, comprising the steps of dispersing said monomer in a liquid system containing a first compound of the formula $R_nMR'_m$, wherein R is a hydrocarbon radical selected from the group consisting of cyclopentadienyl and substituted cyclopentadienyl radicals, M is a metal selected from the class consisting of zirconium and titanium, R' is selected from the group consisting of alkoxy, cycloalkoxy and acyloxy groups and halogen atoms, $n$ is from one to two and $m$ is from one to three, and when $m$ is 3, at least one R' must be selected from the class consisting of halogens and acylates, the sum of $m$ and $n$ being from 3 to 4, said liquid system also containing a second compound, said second compound being selected from the group consisting of aliphatic, aromatic, substituted aromatic, and hydroxy substituted aliphatic organic acids.

In a particularly desirable embodiment this invention contemplates a process as aforesaid wherein said first compound contains a radical selected from the group consisting of cyclopentadienyl, substituted cyclopentadienyl, substituted indenyl, and indenyl radicals. Among such compounds may be mentioned particularly biscyclopentadienylzirconium dichloride, cyclopentadienyltitanium trichloride, biscyclopentadienyltitanium dichloride, bisindenyltitanium dichloride, biscyclopentadienyltitanium monochloride, bismethylcyclopentadienyltitanium dichloride, indenyltitanium dichloride, and monocyclopentadienyltitanium dichloride. The preparation of these compounds has been described in copending application, Serial Number 443,956, D. F. Herman, filed July 16, 1954, and assigned to the assignee hereof. The alkoxy and cycloalkoxy groups, if present, may be substituted or unsubstituted and saturated or unsaturated groups containing up to about 16 carbon atoms. It is preferred however, in the case of the alkoxy and cycloalkoxy groups to employ low molecular weight groups containing less than 7 carbon atoms such as monocyclopentadienyltitanium dibutoxy monochloride, and monocyclopentadienyltitanium dicyclohexoxy monochloride, because such groups are more reactive. The acyloxy group may be substituted, or may be a halogenated acyloxy group as in biscyclopentadienyltitanium di(trichloracetate). The acyloxy group may contain up to about eight carbon atoms. It is preferred however, to employ those acyloxy groups containing six or fewer carbon atoms as these have generally been found to be the most effective.

The second compound, or cocatalyst, may be any aliphatic, hydroxy substituted aliphatic, aromatic, or substituted aromatic carboxylic acid; such acids include tartaric acid, benzoic acid, adipic acid, acetic acid, ortho phthalic acid, salicylic acid, glycolic acid, thioglycolic acid, napthoic acid, ortho toluic acid, succinic acid, propionic acid, oxalic acid, and the like. In the process of this invention, we also mean to include acid anhydrides where available, and acid chlorides where available, since it is readily apparent that the acid anhydrides and acid chlorides would hydrolize in an aqueous system, where the system used is aqueous, to yield the corresponding organic acid.

The ratio of cocatalyst to catalyst may vary widely in the discretion of the individual operator. As much as 5 parts by weight of the cocatalyst to 1 part of the catalyst by weight has been used, and as little as 0.5 part of the cocatalyst to 1 part of the catalyst has been successfully used.

The monomers useful in this process include acrylates, alkyl substituted acrylates, styrene, alkyl substituted styrene, and acrylonitrile.

By acrylate, we mean the esters of acrylic acid containing the $H_2C=CHCOO-$ group, such as methyl acrylates, ethyl acrylate, hexyl acrylate, octyl acrylate, and the like, as well as acrylic acid itself.

By alkyl substituted acrylates, we mean the esters of substituted acrylic acids containing the

group, and having said substitution on the alpha carbon of the

group. Exemplary of such compounds are methyl methacrylate, butyl methacrylate, octyl methacrylate, ethyl-(ethyl acrylate), methyl-(butyl acrylate) and the like, as well as the acids themselves.

The alkyl substituted styrene is one where the alkyl substitution is on the aromatic portion of the molecule, such as vinyl toluene, isopropyl styrene, and the like.

Water should preferably be present, but is not essential. The role of water in the process according to this invention is not fully established, but the process appears to be most effective only when water is present, as the liquid used in the system.

It is possible that the high dielectric constant of the water is a factor in causing the metallic cyclopentadienyl or substituted metallic cyclopentadienyl to break down into active polymerization initiator fragments. When Example I, utilizing a medium having a high dielectric constant is compared to Example XI utilizing a medium having a low dielectric constant, it is readily discernible, that the use of water in Example I resulted in higher percent yields than that of Example XI where benzene was used. The above discussion is not to be construed as binding, and in no way should it be interpreted as limiting the scope of this invention.

The organic liquids which may be used as the reaction medium, other than water, are those organic liquids which are normally used in a polymerization process. Typical of the organic liquids which may be used as the reaction medium are benzene, toluene, xylene, cyclohexane, and the like.

A wetting agent or suspending agent, where water is present as the liquid used in the system, may be used if desired and generally proves advantageous. The choice of a wetting agent is not critical and may be left to the discretion of the operator, or to economic considerations. Wetting and suspending agents such as sodium lauryl sulfate and polyvinyl alcohol and the like may be used.

The time necessary to effect polymerization will vary according to the reaction conditions employed, but is short in all cases. The reaction proceeds readily at moderately elevated temperatures although higher temperatures may be employed, if desired, up to the boiling point of the reaction medium at the pressure employed. No great pressure is necessary in order to cause the reaction to proceed; atmospheric pressure is ordinarily satisfactory. Moderately increased pressures up to about 3 or 4 atmospheres may be employed if desired and are sometimes advantageous.

In order to more fully illustrate the nature of this invention and the manner of practicing the same, the following examples are presented.

*Example I*

To a flask containing 200 parts of water was added 100 parts of methylmethacrylate, 0.025 part of biscyclopentadienyltitanium dichloride 3 parts of a wetting agent which was sodium lauryl sulfate, and 0.030 part of tartaric acid. The reaction was run under a nitrogen atmosphere, stirred, and heated to the reflux temperature of the system until the reaction was substantially complete, which was 4 hours. A good yield of white polymethyl methacrylate was obtained by washing the product with methanol and drying it at moderate temperature under vacuum. The yield was 90%.

As a control, the above procedure was repeated, but no organic acid was herein used. A good yield of white polymethyl methacrylate was obtained in the manner of Example I, described above. The yield obtained in this control however, was not as high as when the organic acid was used.

*Example II*

To a flask containing 100 parts of benzene was added 1 part of biscyclopentadienyltitanium dichloride, 0.5 part of zinc dust, and 5 parts of acetic acid. The reaction was run under a nitrogen atmosphere, stirred, and heated slightly until the reaction was complete. The biscyclopentadienyltitanium dichloride was thus reduced from the tetravalent state, to the trivalent state. The compound formed was biscyclopentadienyltitanium monochloride.

The procedure of Example I was then followed, except that an equivalent amount of biscyclopentadienyltitanium monochloride was used instead of the biscyclopentadienyltitanium dichloride. A high yield of white polymethyl-methacrylate was obtained in the manner of Example I. The yield was 85%.

*Example III*

The procedure of Example I was repeated, but an equivalent amount of biscyclopentadienylzirconium dichloride was used instead of the biscyclopentadienyltitanium dichloride and the reaction was run at 65° C. An amount of oxalic acid, equivalent to the molar ratio of tartaric acid to biscyclopentadienyltitanium dichloride, was substituted for the tartaric acid of Example I. A high yield of white polymethyl-methacrylate was obtained in the manner of Example I. The yield was 90%.

As a control, the procedure of Example III was repeated, but no organic acid was used in this control. A good yield of white polymethyl-methacrylate was obtained in the manner of Example I. The yield obtained in this control however, was not as high as when the organic acid was used.

*Example IV*

The procedure of Example I was repeated, and the reaction was run at 86° C. for 4 hours. The monomer used in this example was an equivalent amount of styrene, equivalent to the molar amount of monomer used in Example I. A good yield of white polystyrene was obtained in the manner of Example I. The yield was 92%.

*Example V*

The procedure of Example I was repeated several times. The organic acid was changed each time in amounts equivalent to molar ratio of tartaric acid to biscyclopentadienyltitanium dichloride used in Example I. Among the organic acids used were: adipic acid, ortho phthalic acid, salicylic acid, glycolic acid, naphthoic acid, ortho toluic acid, benzoic acid, succinic acid, oxalic acid, heptanoic acid, and propionic acid. Each time, a good yield of white polymethyl-methacrylate was obtained in the manner of Example I.

*Example VI*

The procedure of Example I was repeated, but an equivalent amount of monocyclopentadienyltitanium ditrichloroacetoxy monochloride was used instead of the biscyclopentadienyltitanium dichloride. A good yield of white polymethyl methacrylate was obtained in the manner of Example I.

*Example VII*

The procedure of Example I was repeated several times. Each time an equivalent amount of a different monomer, equivalent to the molar amount of monomer used in Example I, was used in this Example VII. Among the monomers used were: methyl acrylate, butyl acrylate, hexyl acrylate, octyl acrylate, ethyl acrylate, methacrylic acid, octyl methacrylate, ethyl-(ethylacrylate), methyl-(butylacrylate), vinyl toluene, isopropyl styrene, and acrylic acid. Each time a good yield of white polymer was obtained in the manner of Example I. The yield in all cases was approximately 90%.

*Example VIII*

The procedure of Example I was repeated, but an equivalent amount of monocyclopentadienyltitanium dichloride was used instead of the biscyclopentadienyltitanium dichloride. A high yield of white polymethylmethacrylate was obtained in the manner of Example I.

*Example IX*

The procedure of Example I was repeated several times. Each time an equivalent amount of a different titanium compound was used in the reaction. Among the titanium compounds used were: methylcyclopentadienyltitanium dichloride, and indenyltitanium trichloride. Each time a high yield of white polymer was obtained in the manner of Example I.

*Example X*

The procedure of Example I was repeated, but the monomer used in this Example X was acrylonitrile in place of the monomer used in Example I. A good yield of white polymer was obtained in the manner of Example I.

*Example XI*

The procedure of Example I was repeated, except that 100 parts of benzene was used in this example in place of the water used in Example I and no wetting agent was used in this Example XI. A good yield of white polymethyl methacrylate was obtained in the manner of Example I.

The yield however, in this Example X, was not as high as when water was present in the reaction mixture.

*Example XII*

The polymethyl methacrylate formed in Example I was compression molded into several articles, such as an electrical fixture housing an automobile tail light housing, a costume jewelry bracelet, and an identification disk. The compression molding was accomplished via conventional compression molding methods.

Polystyrene, prepared according to the process of Example IV, was compared with a typical commercial polystyrene. It was found that the polystyrene prepared according to the process of this invention had a tensil strength 32% greater, a net impact strength 131% greater, and a deformation under load of 43% less, all compared to the typical commercial polystyrene. These figures on mechanical properties mean that the polystyrene prepared according to the process of this invention, is able to absorb more energy than the typical commercial polystyrene, before deforming or failing. From a practical point of view, articles may be fabricated from polystyrene prepared according to the process of this invention where greater overall strength, rigidity, less cold flow, and where resistance to repeated blows are required such as in toys, battery cases, and radio cabinets.

The process of this invention is simple and readily can be carried out by the operator, without special skill or training. The use of water as the reaction medium in one embodiment of this invention substantially eliminates other costly and hazardous media. The organic acids herein used are a new application of these compounds when used with the titanium compounds herein described to effect an aqueous polymerization, and the entire system is effective in the presence of water.

The resultant polymers may be used to make a wide variety of articles, such as electrical insulation, radome housings, ornaments, electrical fixtures housings, household goods such as spoons, dishes, cups, etc., adhesives, protective coatings, and the like. These uses may be accomplished via injection molding, extruding, compression molding, and casting. The extruding enables the producer of the polymers to supply the manufacturer of various articles with a convenient form of the polymer ready for processing into the finished article.

While this invention has been described in terms of certain preferred embodiments and illustrated by means of specific examples, these are illustrative only, and the invention is not to be construed as limited, except as set forth in the following claims.

We claim:

1. A process for the polymerization of vinyl and related monomers, said monomer being selected from the group consisting of acrylic acid and esters thereof, alkyl substituted acrylic acid and esters thereof, styrene, alkyl mono-substituted styrene, said mono-substitution being on the aromatic portion of the molecule, and acrylonitrile, comprising the steps of dispersing said vinyl monomer in a liquid system containing a first compound of the formula $R_nMR'_m$; wherein R is a hydrocarbon radical selected from the group consisting of cyclopentadienyl and substituted cyclopentadienyl radicals, M is a metal selected from the class of metals consisting of zirconium and titanium, R' is selected from the group consisting of alkoxy, cycloalkoxy and acyloxy groups, and halogen atoms, $n$ is from one to two and $m$ is from one to three, and when $m$ is three, at least one R' must be selected from the class consisting of halogens and acylates, the sum of $m$ and $n$ being from 3 to 4, said liquid system also containing a second compound, said second compound being selected from the group consisting of unsubstituted aliphatic, unsubstituted aromatic, hydroxy-substituted and lower alkyl-substituted aromatic, and hydroxy substituted aliphatic organic acids said second compound being present in amount from 0.5 to 5 parts by weight for each part by weight of said first compound.

2. A process according to claim 1, wherein said liquid is water.

3. A process according to claim 1, wherein said second compound is tartaric acid.

4. A process according to claim 1, wherein said second compound is oxalic acid.

5. A process according to claim 1, wherein said second compound is benzoic acid.

6. A process according to claim 1, wherein said liquid is benzene.

7. A process according to claim 1, wherein said liquid is toluene.

8. A process according to claim 1, wherein said liquid is xylene.

9. A process according to claim 1, wherein said liquid is cyclohexane.

10. A process according to claim 1, wherein said first compound is biscyclopentadienyltitanium dichloride.

11. A process according to claim 1, wherein said first compound is biscyclopentadienylzirconium dichloride.

References Cited in the file of this patent

UNITED STATES PATENTS

| | | |
|---|---|---|
| 2,827,446 | Breslow | Mar. 18, 1958 |
| 2,922,803 | Kaufman | Jan. 26, 1960 |
| 2,952,670 | Fischer | Sept. 13, 1960 |
| 2,952,697 | Gorsich | Sept. 13, 1960 |

FOREIGN PATENTS

| | | |
|---|---|---|
| 555,789 | Belgium | Mar. 14, 1957 |
| 793,354 | Great Britain | Apr. 16, 1958 |

OTHER REFERENCES

Gaylord et al.: Linear and Steroregular Addition Polymers, pp. 95–96, 221, 223, 226, Interscience, 1959.